United States Patent [19]

Jorgensen

[11] 3,925,281

[45] Dec. 9, 1975

[54] VULCANIZABLE ACRYLATE RUBBER COMPOSITIONS

[75] Inventor: August H. Jorgensen, Rocky River, Ohio

[73] Assignee: The B. F. Goodrich Company, Akron, Ohio

[22] Filed: June 5, 1974

[21] Appl. No.: 476,587

[52] U.S. Cl.... 260/23 AR; 260/47 UP; 260/63 UY; 260/78.5 N; 260/79.7; 260/80.7; 260/80.73; 260/80.76; 260/80.81
[51] Int. Cl.$^2$..... C08F 8/34; C08F 8/40; C08F 8/42
[58] Field of Search........... 260/80.81, 80.76, 80.73, 260/80.7, 79.7, 63 R, 63 UY, 78.5 N, 23 AR, 47 UP; 410/614, 615, 618.5

[56] References Cited
UNITED STATES PATENTS

| | | | |
|---|---|---|---|
| 3,397,193 | 8/1968 | Aloia et al. | 260/80.81 |
| 3,510,442 | 5/1970 | Chalmers | 260/23 |

*Primary Examiner*—Stanford M. Levin
*Attorney, Agent, or Firm*—Alan A. Csontos

[57] ABSTRACT

Acrylate rubbers containing interpolymerized units of β-cyanoalkyl acrylate monomers and having halogen cure sites are cured using a combination of (1) an alkali metal salt of an organic acid and (2) either a quaternary ammonium salt or a monofunctional tertiary amine, and, optionally, an acid acceptor. The vulcanizable composition has good scorch safety yet readily cures upon heating to yield useful vulcanizates.

10 Claims, No Drawings

VULCANIZABLE ACRYLATE RUBBER COMPOSITIONS

BACKGROUND OF THE INVENTION

Acrylate rubbers are known for their good oxidative stability, high temperature heat resistance, and oil resistance. The rubbers are cured through cure sites (normally chlorine sites) present along the backbone of the polymer. Various cure systems have been developed (See U.S. Pat. Nos. 2,600,414; 3,324,088; 3,458,461; and 3,746,674, and an article in Rubber Chemistry and Technology, Vol. 44, No. 2 (Apr., 1971), Page 344).

To this art area, the inventor contributes a novel vulcanizable composition comprising (1) a defined acrylate rubber containing interpolymerized units of a β-cyanoalkyl acrylate monomer and having halogen cure sites and (2) a defined cure system consisting essentially of alkali metal organic acid salts and either quaternary ammonium salts or monofunctional tertiary amines. Relevant art in this area is U.S. Pat. Nos. 2,649,439; 3,031,436; 3,113,122; and 3,397,193.

SUMMARY OF THE INVENTION

Vulcanizable compositions comprising (1) an acrylate rubber comprising interpolymerized units of (a) a major portion of an acrylate monomer of the formula

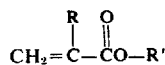

wherein R is hydrogen or a methyl or ethyl radical and R' is an alkyl radical containing 1 to about 24 carbon atoms, or an alkoxyalkyl or alkylthioalkyl radical containing a total of 2 to about 12 carbon atoms in the radical, (b) a minor amount of halogen-bearing monomer, (c) a small amount of a β-cyanoalkyl acrylate monomer of the formula

where R is defined as above, and (d) optionally, a minor amount of a copolymerizable vinylidene monomer, and (2) a cure system consisting essentially of (a) an alkali metal salt of an organic acid, and (b) a quaternary ammonium salt or a monofunctional tertiary amine, exhibit good scorch safety at processing temperatures yet readily cure at vulcanization temperatures to yield useful vulcanizates. The ues of an acid acceptor in the cure system is optional.

DETAILED DESCRIPTION OF THE INVENTION

The vulcanizable acrylate rubber compositions are comprised of a defined acrylate rubber and a cure system therefore. The compositions have good shelf stability and good scorch safety at processing temperatures (i.e., 200°F. to about 275°F.). On heating to vulcanization temperatures (i.e., about 275°F. to about 450°F.), the compositions readily cure and vulcanizates exhibiting the unique and useful properties of acrylate rubbers are obtained. The cured vulcanizates are particularly useful where oxidative stability, good oil resistance, high temperature heat resistance, weatherability, and the like are dessired. Applications include hosing, belting, weather stripping, seals, gaskets and the like.

The acrylate rubber consists essentially of interpolymerized units of (a) from about 50% by weight to about 99.8% by weight of an acrylate monomer of the formula

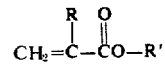

wherein R is H, —CH$_3$ or —C$_2$H$_5$, and R' is an alkyl radical containing 1 to about 24 carbon atoms, or an alkoxyalkyl or alkylthioalkyl thioalkyl radical containing 2 to about 12 carbon atoms total in the radical, (b) from about 0.1% to about 15% to about 15% by weight of a halogen-bearing monomer, (c) from about 0.1% to about 4% by weight of a β-cyanoalkyl acrylate of the formula

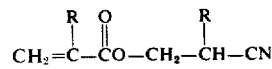

wherein R is defined as above, and (d) up to 49.8% by weight of a copolymerizable monomer containing a terminal vinylidene (CH$_2$=C<) group. A more preferred composition is from about 70% to about 99.3% by weight of (a), about 0.5% to about 5% by weight of (b), about 0.2% to about 2% by weight of (c), and up to about 29.3% by weight of (d).

Examples of the acrylate monomers are methyl acrylate, ethyl acrylate, n-propyl acrylate, isopropyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-tetradecyl acrylate, n-octadecyl acrylate, n-eicosyl acrylate, and the like; methyl methacrylate, ethyl methacrylate, n-hexyl methacrylate, n-octyl methacrylate, n-dodecyl methacrylate, n-octadecyl methacrylate, ethyl ethacrylate, n-butyl ethacrylate, and the like; and methoxyethyl acrylate, ethoxyethyl acrylate, butoxyethyl acrylate, ethoxypropyl acrylate, methoxyethyl methacrylate, methylthioethyl acrylate, hexylthioethyl acrylate, and the like. Often mixtures of two or more types of acrylate monomers are employed.

More preferredly, R' is an alkyl radical containing 1 to about 18 carbon atoms or an alkoxyalkyl radical containing 3 to about 8 carbon atoms total in the radical. Examples of the more preferred monomers are ethyl acrylate, n-propyl acrylate, isopropyl acrylate, n-butyl acrylate, n-pentyl acrylate, isoamyl acrylate, n-hexyl acrylate, n-octyl acrylate, 2-ethylhexyl acrylate, n-decyl acrylate, n-dodecyl acrylate, n-octadecyl acrylate, methoxyethyl acrylate, ethoxyethyl acrylate, methoxypropyl acrylate, ethoxypropyl acrylate, and the like. Both an alkyl acrylate and an alkoxyalkyl acrylate can be used. Especially good results are obtained when employing ethyl acrylate, n-butyl acrylate, 2-ethylhexyl acrylate, methoxyethyl acrylate, ethoxyethyl acrylate, or mixtures of the same.

Examples of halogen-bearing monomers are halogen-bearing vinylidene hydrocarbons such as vinyl benzyl chloride, vinyl benzyl bromide, 5-chloromethyl-2-norbornene, 5-bromomethyl-2-norbornene, 5-β-chloroethyl-2-norbornene, and the like; and chloroprene, bromoprene, 2-β-chloroisopropyl butadiene, and the like; and halogen-bearing vinylidene hydrocarbons containing oxy linkages such as halogen-bearing vinyl esters such as vinyl chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether; halogen-containing vinyl ketones such as chloromethyl vinyl ketone, 2-chloroethyl vinyl ketone, and the like; and 5-chloroacetoxymethyl-2-norbornene, 5-($\alpha$, $\beta$-dichloropropionylmethyl)-2-norbornene, and the like. Examples of the more preferred halogen-bearing vinylidene monomers are vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chlorode, chloroprene, 5-chloromethyl-2-norbornene, 2-chloroacetoxyethyl acrylate and methacrylate, and 5-chloroacetoxymethyl-2-norbornene.

Examples of the $\beta$-cyanoalkyl acrylate monomers are $\beta$-cyanoethyl acrylate, $\beta$-cyanopropyl acrylate, $\beta$-cyanobutyl acrylate, $\beta$-cyanoethyl methacrylate, and the like.

The acrylate monomers as described, the halogen-containing monomers, and the $\beta$-cyanoalkyl acrylate monomers, are readily interpolymerized together to form the unique polymers of this invention. Often the three types of monomers are yet interpolymerized with other copolymerizable monomers containing a terminal vinylidene ($CH_2=C<$) group. Examples of these monomers present as interpolymerized units in up to 48.8% by weight in the polymer are phenyl acrylate and cyclohexyl acrylate; vinyl and allyl esters such as vinyl acetate, vinyl propionate, vinyl butyrate, allyl acetate, and the like; vinyl ketones such as methyl vinyl ketone, propyl vinyl ketone, and the like; vinyl and allyl ethers such as vinyl methylether, vinyl ethylether, vinyl isobutylether, allyl methylether, and the like; vinyl aromatics such as styrene, $\alpha$-methylstyrene, vinyl toluene, vinyl naphthalene, and the like; vinyl nitriles such as acrylonitrile, methacrylonitrile, and the like; dienes such as butadiene, isoprene, 2-isopropyl-1,3-butadiene, and the like; $\alpha$-monoolefins such as ethylene, propylene, 1-butene, 1-hexene, and the like; divinyls such as divinyl benzene, divinyl ether, ethylene glycol diacrylate and dimethacrylate, and the like; and vinyl amides such as acrylamide, methacrylamide, N-methyl methacrylamide, and the like.

The acrylate rubbers can be prepared using emulsion (latex) suspension, solution, and bulk techniques known to those skilled in the art. Because it is desirable to polymerize the monomers to 90 percent conversion or over, emulsion and suspension techniques are usually employed. The polymerization can be performed as a batch reaction, or one or more ingredients can be proportioned during the run. Temperature of polymerization ranges from about −10°C. to about 100°C., whereas a more preferred range is from about 5°C. to about 80°C.

The polymerization can be initiated by free-radical generating agents. Examples of such agents are organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agents such as benzophenone, triphenylphosphine, organic diazos, and the like.

Typical emulsion polymerization ingredients would include a persulfate salt or organic peroxide and usually a redox system, water adjusted to a desired pH with acids or bases and usually buffered with inorganic salts, and either anionic, cationic, or nonionic surface active agents well known to the art.

The polymerization is normally continued until about 90% or over conversion of monomers to polymer is obtained. The resulting latex can be coagulated to isolate the polymer. Typical coagulation procedures are salt/acid coagulations, use of polyvalent metal salts such as $MgSO_4$, use of alcohols such as methanol and isopropyl alcohol, and freeze agglomeration techniques. The rubber is then usually washed with water and dried.

The acrylate rubbers are solid elastomers having a dilute solution viscosity (DSV) of over 0.5 as measured on 0.4 grams of rubber in 100 ml. methylethyl ketone at 25°C. Raw polymer Mooney values (ML-4, at 212°F.) are from about 20 to about 100.

The rubbers are admixed with cure ingredients and compounding ingredients using two-roll mills, internal mixers such as Banburys and extruders, and like equipment.

The acrylate rubbers can be vulcanized using known curatives. Examples of these curvatives are the soap-sulfur systems such as potassium and sodium stearate, sodium acetate, and potassium tartate with sulfur or sulfur donors such as dipentamethylene thiuram hexasulfide; polyamines such as hexamethylene diamine, triethylene diamine, triethylene tetraamine, and the like; and ammonium-carboxylic acid salts such as ammonium benzoate, ammonium adipate, and ammonium stearate, used alone or with alkyl halides such as dodecyl bromide.

It has been discovered that the unique acrylate rubbers can be effectively and efficiently vulcanized using a cure system different than those previously described. The cure system does not use sulfur in elemental or donor form, nor does it use polyfunctional amines. The cure system consists essentially of (1) an alkali metal salt of an organic acid, and (2) a quaternary ammonium salt or a monofunctional tertiary amine. The use of an acid acceptor is optional.

The alkali metal salts of the organic acids are used at a level from about 0.5 part to about 7 parts by weight, and more preferredly, from about 1 part to about 5 parts by weight per 100 parts by weight of the acrylate rubber.

Examples of organic acids include carboxylic acids, organophosphoric acids, and organosulfonic acids. The carboxylic acid is preferredly a monocarboxylic acid containing from 2 to about 24 carbon atoms in the molecule, and more preferredly, 6 to 20 carbon atoms. The acids may be unsaturated and can contain hydroxy, ether, ester, or ketonic groups. Examples of such acids are acetic acid, propionic acid, isopropionic acid, valeric acid, caproic acid, octanoic acid, 2-ethyl hexanoic acid, decanoic acid, lauric acid, palmitic acid, stearic acid, cyclohexane carboxylic acid, crotonic acid, cinnamic acid, hydroxy acetic acid, acetoacetic acid, butoxy acetic acid, levulinic acid, mono-2-octyl maleate, benzoic acid, phthalic acid, toluic acid, salicyclic acid, naphthenic acid, and the like. Preferredly, the carboxylic acid is a saturated alkyl or an aromatic monocarboxylic acid. Potassium and sodium are the preferred alkali metals. Examples of the more preferred carboxylic acid metal salts are sodium octanoate, potassium 2-ethyl hexanoate, sodium t-dodecanoate, sodium and potassium tetradodecanoate, sodium and potassium stearate, sodium and potassium benzoate. The alkali metal salts of organo-phosphoric acids are characterized by the structure

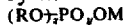

wherein M is an alkali metal, $y=1$ or 2, $z=1$ or 2, and $y + z = 3$, and R is an alkyl radical containing 1 to 24 carbon atoms, an aryl radical containing 6 to 24 carbon atoms, or a polyether as the condensation product of an organic acid or alcohol with ethylene oxide. Examples of these compounds are sodium salt of monophenyl phosphate, sodium salt of mono-p-tert-butyl phenyl phosphate, potassium salt of di-o-xenyl phosphate, sodium salt of mono-lauryl phosphate, sodium salt of di-octyl phosphate, potassium salt of distearyl phosphate, potassium salt of mono-dodecyl-mono-benzyl phosphate, and sodium and potassium salts of mono- and dialkylphenoxy poly(ethyleneoxy)ethyl phosphates. More preferredly, M is sodium or potassium, and R, when an alkyl radical, contains about 8 to about 18 carbon atoms, and, when an aryl radical, contains 6 to about 14 carbon atoms. The alkali metal salts of organosulfonic acids are characterized by the structure

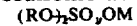

wherein R, R, y and z are defined as before. Examples of organosulfonic acid metal salts are sodium and potassium salt of dodecylbenzene sulfonic acid, sodium alkylnaphthalene sulfonate, sodium lauryl sulfonate, and the like.

The second essential component of the cure system is either a quaternary ammonium salt or a monofunctional tertiary amine. The ingredients are used at a level from about 0.1 part to about 10 parts by weight and more preferredly, at from about 0.3 part to about 5 parts by weight per 100 parts by weight of the acrylate rubber.

The quaternary ammonium salts are ammonium salts in which all four hydrogen atoms have been replaced with organic radicals. The quaternary ammonium salts include the structure

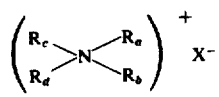

wherein $R_a$, $R_b$, $R_c$ and $R_d$ are hydrocarbon radicals containing 1 to about 18 carbon atoms such as alkyl, aryl, alkaryl and aralkyl radicals, or wherein two or three of the $R_a$, $R_b$, $R_c$ and $R_d$ radicals form with the nitrogen atom a heterocyclic structure containing 3 to 8 atoms selected from the group consisting of C, N, O and S, where at least two atoms are C; and X is an anion from an inorganic or organic acid wherein the acidic hydrogen is attached to halogen or oxygen. More preferredly, X is an anion such as $Cl^-$, $Br^-$, $I^-$, $OH^-$, $NO_3^-$, $HSO_4^-$, $NaSO_4^-$, $H_2PO_4^-$, $NaHPO_4^-$, $RCOO^-$, $ROSO_3^-$, $RSO^{3-}$, $H_2BO_3^-$, and $ROPO_3H^-$, and R is an aliphatic, alkyl or alkaryl radical containing 1 to 18 carbon atoms. The aliphatic radical can contain ether, thioether, and/or ester structures. For example it can be the reaction product of an organic acid or alcohol with ethylene oxide, such as alkylphenoxy poly(ethyleneoxy)ethyl structures.

Examples of the quaternary ammonium salts are tetramethyl ammonium chloride, tetramethyl ammonium bromide, trimethyl ethyl ammonium iodide, trimethyl soya ammonium chloride, trimethyl cetyl ammonium bromide, trimethyl soya ammonium neodecanoate, trimethyl soya ammonium trimethylhexanoate, trimethyl benzyl ammonium benzoate, trimethyl benzoyl ammonium chloride, trimethyl benzyl ammonium paratoluene sulfonate, trimethyl soya ammonium alkylbenzene sulfonate, dimethyl ethyl cetyl ammonium chloride, dimethyl octyl benzyl ammonium chloride, dimethyl oleyl benzyl ammonium chloride, dimethyl octadecyl benzyl ammonium chloride, dimethyl phenyl benzyl ammonium bromide, dimethyl dibenzyl ammonium bromide, methyl ethyl propyl isobutyl ammonium chloride, (tetradecyl)trimethyl ammonium chloride, methyl cetyl dibenzyl ammonium bromide, cetyl pyridinium chloride, dodecyl pyridinium bromide, lauryl pyridinium sulfate, trimethyl benzyl ammonium borate, trimethyl benzyl ammonium hydrogen phosphate, trimethyl benzyl ammonium alkylphenoxy poly(ethyleneoxy)ethyl phosphate, and the like.

The monofunctional tertiary amines can be used in their natural form or as amine precursors or as an amine/acid salt.

The amine precursors and amine/acid salts are added at levels which yield the desired level of amine catalyst. For example, if the amine forms forty percent by weight of the compound, and 1 part by weight of the amine is desired, 2.5 parts by weight of the compound would be added to the acrylate rubber. The monofunctional tertiary amines can be aliphatic amines, cyclic methyleneamines, or heterocyclic amines. Examples of such amines are trimethyl amine, triethyl amine, dimethylbutyl amine, dimethylbenzyl amine, methyl dibenzyl amine, dimethyl ethanol amine, methyl diethanol amine, N-methyl piperidine, N-methyl morpholine, quinuclidine, pyridine, 3-ethyl-4-methyl pyridine, 3-phenylpropylpyridine, and the like. The more preferred tertiary amines are the cyclic methyleneamines and heterocyclic amines containing 4 to 8 atoms in the ring, and the tertiary aliphatic amines containing 1 to about 18 carbon atoms in the aliphatic groups, provided that at least one aliphatic group is a methyl or ethyl radical.

The tertiary amines can be employed as amine/acid adducts. In this form, increased scorch safety can be obtained. The acids can be inorganic or organic acids. Examples of the acids are hydrochloric acid, phosphoric acid, lauryl sulfonic acid, benzene sulfonic acid, paratoluene sulfonic acid, alkylbenzene sulfonic acids, aromatic carboxylic acids such as benzoic acid, and aliphatic carboxylic acids such as acetic acid, propionic acid, butyric acid, hexanoic acid, 2-ethylhexanoic acid, dodecanoic acid, octadecanoic acid, naphthenic acid, and the like. When used in the amine/acid form, the strong tertiary aliphatic amines such as trimethylamine and triethylamine can be conveniently employed. Examples of tertiary amine/acid adducts are trimethylamine/hydrochloric acid adduct, trimethylamine/phosphoric acid adduct, trimethylamine/sodium hydrogen sulfate adduct, trimethylamine/benzoic acid adduct, triethylamine/butyric acid adduct, triethylamine/dodecanoic acid adduct, triethylamine/benzene sulfonic acid adduct, N-methyl piperidine/lauryl sulfonic acid adduct, N-methyl piperidine/benzoic acid adduct, N-methyl piperidine/2-ethylhexanoic acid adduct, quinuclidine/hydrochloric acid adduct, 3-phenylpropylpyridine benzoic acid adduct, and the like. If an amine/acid adduct is used, an acid absorber should be present in sufficient quantity to neutralize the released acid.

The tertiary amines can also be employed as tertiary amine precursors. Aminimides break down at vulcanization temperature to release a tertiary amine. Used in the compositions of this invention, the aminimides allow for greater scorch safety and yet a fast cure. Examples of these compounds are bis(trimethylamine)-sebacimide, bis(dimethyl-2-hydroxypropyl-amine) adipimide, dimethyl-2-hydroxypropylamine laurimide, and dimethyl-2-hydroxypropylamine stearimide.

The third ingredient of the cure system, i.e., the acid acceptor, is an optical ingredient. It is used to help develop a more rapid and complete cure of the acrylate rubber. The level of use of the acid acceptor ranges up to 15 parts by weight, and more preferredly (when used), from about 0.3 part to about 10 parts by weight based upon the weight of the acrylate rubber. The acid acceptor is selected from the group consisting of nonalkali metal oxy compounds, inorganic metal salts, and molecular sieves (untreated).

The nonalkali metal oxy compounds include oxides, hydroxides and carbonates of multivalent barium (Ba), lead (Pb), calcium (Ca), magnesium (Mg), zinc (Zn), copper (Cu), aluminum (Al), and cadmium (Cd). The more preferred nonalkali metal oxy compounds are the oxides and hydroxides of barium, lead, calcium, and magnesium. Examples of these compounds are barium oxide, barium hydroxide, barium carbonate, lead monoxide, lead dioxide, red lead oxide, lead sesquioxide, lead hydroxide, lead carbonate, calcium oxide, calcium hydroxide, calcium carbonate, magnesium oxide, magnesium hydroxide, magnesium carbonate, cupric oxide, cupric hydroxide, cupric carbonate, cadmium oxide, and cadmium hydroxide.

Inorganic acid metal salts include alkali and alkaline earth metal carbonates, borates, silicates, and phosphates. Examples of these are sodium carbonate, potassium and sodium silicates, calcium silicate, barium silicate, calcium borate, lithium and sodium borate, sodium and potassium phosphate and hydrophosphate, barium phosphate, and the like.

Untreated (i.e., non-loaded) molecular sieves, especially in a light powder form, are useful as the acid acceptor.

The acrylate rubbers can be admixed with many other rubber compounding ingredients. Examples of such ingredients are fillers such as the carbon blacks, calcium sulfates, aluminum silicates, phenol formaldehyde and polystyrene resins, asbestos, and the like; plasticizers and extenders such as dialkyl and diaryl organic esters like diisobutyl, diisooctyl, and dibenzyl sebacates, azelates, phthalates, and the like, petroleum oils, castor oil, tall oil, glycerin, and the like; antioxidants, and stabilizers such as phenyl-$\beta$-naphthylamine, 2,6-di-t-butyl paracresol, 2,2'-methylenebis-(4-ethyl-6-t-butyl phenol), 2,2'-thiobis-(4-methyl-6-t-butyl phenol), 4,4'-butylidene bis-(6-t-butyl-m-cresol), tris-(3,5-di-t-butyl-4-hydroxybenzyl)isocyanurate, tetrakis-methylene-3(3',5'-di-t-butyl-4'-hydroxyphenyl propionate methane, distearyl thiodipropionate, tri - nonylatedphenyl)phosphite, and the like; and other ingredients such as pigments, tackifiers, flame retardants, fungicides, and the like.

The novel compositions are cured at temperatures from about 250°F. to about 450°F., whereas a more preferred range is from about 275°F. to about 400°F. Cure time varies inversely as temperature, and ranges from about 1 minute to about 60 minutes or more. The polymers can be post-cured for about 3 to 24 hours at a temperature from about 300°F. to about 375°F.

The novel compositions develop rapid and stable cures. The vulcanizates were evaluated as to their plied disc compression set (ASTM D395V), tensile and elongation (ASTM D412), hardness (ASTM D676 - Durometer A), oil aging and volume swell (ASTM D471), and air test tube aging (ASTM D865). Cure times were determined following ASTM D1646, using a Mooney Viscometer with a large rotor, or using a Monsanto rheometer.

EXAMPLES

The unique acrylate rubbers can be prepared using emulsion, suspension, solution, or bulk polymerization techniques known to the art. The polymers herein described were made using a standard polymerization recipe and emulsion polymerization technique. The general recipe used is as follows:

| | |
|---|---|
| Monomers, grams | 100 |
| Water, grams | 100 |
| Gafac PE 510[a], grams | 2 |
| NaOH, grams | 0.1 |
| Daxad 17[b], grams | 0.5 |
| Sodium Sulfate, grams | 0.3 |
| $Na_2S_2O_4$ | 0.02 |
| Hampene 100[c] | 0.024 |
| Hampshire NaFe[d] | 0.01 |
| SFS[e] | 0.04 |
| Paramenthane Hydroperoxide | 0.07 |

[a] alkylphenoxy poly(ethyleneoxy)ethyl phosphate
[b] polymerized alkyl naphthalene sulfonic acid
[c] tetrasodium salt of ethylene-diamine tetraacetic acid
[d] sodium ferric ethylenediamine tetraacetic acid
[e] sodium formaldehyde sulfoxalate The procedure used is as follows. One half of the water and all of the Daxad and sodium sulfate was added to a clean reactor vessel which had been previously evacuated and purged with nitrogen gas. The remaining one half of the water and the monomers, the NaOH and the Gafac PE510 were mixed together in a vessel. 5% by weight of the mixture was then put into the reactor vessel. The reactor vessel was cooled to about 20°C. and the paramenthane hydroperoxide, the Hampene 100, the Hampshire NaFe, the SFS, and the $Na_2S_2O_4$ added. The remaining monomer mixture was proportioned to the reactor vessel over a period of two hours. Reaction temperature was maintained at 24 ± 6°C. throughout the polymerization run. Final percent conversion of monomers to polymer was about 95% by weight or higher in each case. The polymers were isolated from the resulting latex by coagulation using a 2% by weight solution of magnesium sulfate as the coagulant. The polymers were then washed 3 times with water and dried under a vacuum.

Using the standard recipe and polymerization procedure various acrylate rubbers were prepared. The rubbers were admixed with curatives, vulcanized, and physical properties were determined.

EXAMPLE I

An acrylate rubber having chlorine cure sites and containing interpolymerized units of $\beta$-cyanoethyl acrylate monomer was prepared following the recipe and process described above. The rubber is comprised of 75% by weight n-butyl acrylate, 23.3% by weight ethyl acrylate, 1.2% by weight of vinyl benzyl chloride, and 0.5% by weight of β-cyanoethyl acrylate. The rubber was cured using a core system of this invention, and the following properties were obtained.

|  | 1 | 2 | 3 |
|---|---|---|---|
| Acrylate rubber | 100 | 100 | 100 |
| N550 Carbon black | 80 | 80 | 80 |
| Acrawax C* | 2 | 2 | 2 |
| TE-80* | 2 | 2 | 2 |
| Sodium Stearate | 3 | 3 | — |
| Potassium Stearate | — | — | 3 |
| Molecular Sieve type 4A | — | 5 | 5 |
| Trimethyl Soya^a ammonium chloride | 3 | 3 | 3 |
| Cured 30 minutes at 307°F. |  |  |  |
| Tensile, psi | 1230 | 1120 | 1170 |
| Elongation, percent | 210 | 200 | 200 |
| Hardness, Durometer A | 65 | 65 | 67 |
| Compression set, percent Buttons, 70 hours at 150°C | 53 | 36 | 35 |

*processing aids
^a a C$_{14}$-C$_{18}$ hydrocarbon mixture from soyabean oil

The data shows that the unique acrylate rubber was readily and efficiently cured using a combination of an alkali metal salt of a carboxylic acid and a quaternary ammonium salt as the only curatives (Sample 1). The use of an acid acceptor (i.e., the molecular sieves) in the cure system yields lower compression set properties (Samples 2 and 3). No sulfur is needed to effect cure of the rubber.

A similar acrylate rubber was also cured using as the cure system (based on 100 parts by weight of the rubber) 3 parts by weight of sodium stearate, 0.5 parts by weight of bis(trimethylamine)sebacimide - a tertiary amine precursor, and 5 parts by weight of molecular sieves type 4A. After cure for 30 minutes at 307°F., the vulcanized composition had a tensile of 640 psi, an elongation of 210 percent, a hardness of 69, and a compression set of 72 percent.

EXAMPLE II

Acrylate rubbers were prepared following the procedure given above. The rubbers are Rubber A (78% by weight n-butyl acrylate, 20.3% ethyl acrylate, 1.2% vinyl benzyl chloride, and 0.5% by weight of β-cyanoethyl acrylate), and Rubber B (78% by weight n-butyl acrylate, 20% ethyl acrylate, 1.2% vinyl benzyl chloride, 0.5% β-cyanoethyl acrylate, and 0.3% by weight ethylene glycol dimethacrylate). Rubber A has a raw polymer Mooney (ML-4 at 212°F.) of 32, a dilute solution viscosity (DSV) of 5.7 and a glass transition temperature (Tg via DTA) of −40°C. Rubber B has a 39 Mooney (ML-4 at 212°F.), a DSV of 1.1 and a Tg of −38°C. The rubbers were cured and the following physical properties were obtained. Two control rubber samples were also evaluated: Control A having a composition similar to Rubber A but for 20.8% by weight of ethyl acrylate and no β-cyanoethyl acrylate and Control B similar to Rubber B but for 20.5% by weight of ethyl acrylate and no β-cyanoethyl acrylate. Both of the control rubbers have Mooney values (ML-4 at 212°F.) of 32.

|  | 1 | 2 | 3 | 4 | 5 | 6 |
|---|---|---|---|---|---|---|
| Rubber A | 100 | 100 | 100 | — | — | — |
| Control A | — | — | — | 100 | — | — |
| Rubber B | — | — | — | — | 100 | — |
| Control B | — | — | — | — | — | 100 |
| N550 Black | 80 | 80 | 80 | 80 | 80 | 80 |
| Acrawax C | 2 | 2 | 2 | 2 | 2 | 2 |
| TE-80 | 2 | 2 | 2 | 2 | 2 | 2 |
| MgO | — | 0.1 | 0.5 | — | — | — |
| Sodium Stearate | 3 | 3 | 3 | 3 | 3 | 3 |
| Trimethyl Soya Ammonium Chloride | 3 | 3 | 3 | 3 | 3 | 3 |
| Cured 30 minutes at 307°F. |  |  |  |  |  |  |
| Tensile, psi | 1320 | 1300 | 1480 | 380 | 1250 | 430 |
| Elongation, percent | 180 | 140 | 110 | 370 | 160 | 380 |
| Hardness, Durometer A | 64 | 68 | 73 | 60 | 66 | 65 |
| Cured 60 Minutes at 307°F. |  |  |  |  |  |  |
| Compression set, percent Buttons, 70 hours at 150°C. | 35 | 30 | 33 | 80 | 38 | 76 |
| Aged 70 hours at 175°C. Air Test Tube |  |  |  |  |  |  |
| Tensile, psi | 1170 | 1140 | 1440 | 430 | 1150 | 450 |
| Elongation, percent | 120 | 90 | 80 | 360 | 110 | 350 |
| Hardness, Durometer A | 78 | 80 | 82 | 66 | 75 | 65 |

The data demonstrates the rapid and effective cure of the compositions of this invention (Samples 1, 2, 3 and 5). When the rubber does not contain interpolymerized units of a β-cyanoalkyl acrylate monomer, a markedly inferior vulcanizate is obtained upon cure (Samples 4 and 6).

EXAMPLE III

A series of acrylate rubbers were prepared. Each rubber was admixed with a cure system consisting essentially of sodium stearate and a quaternary ammonium salt, and the compositions vulcanized and evaluated as to their cured properties. The rubbers are identified as follows.

|  | C | D | E | F | G | H | Control −1 | Control −2 |
|---|---|---|---|---|---|---|---|---|
| n-Butyl Acrylate | 80 | 52 | 50 | — | 78 | 78 | 78 | 78 |
| Ethyl Acrylate | 18 | — | — | 48.3 | 20.5 | 20 | 20.3 | 20.2 |
| 2-Ethylhexyl Acrylate | — | — | — | 50 | — | — | — | — |
| Methoxyethyl Acrylate | — | 46.3 | — | — | — | — | 0.5 | — |
| Ethoxyethyl Acrylate | — | — | 48.3 | — | — | — | — | 0.6 |
| Ethylene Glycol Dimethacrylate | 0.3 | — | — | — | — | — | — | — |
| Vinyl Benzyl Chloride | 1.2 | 1.2 | 1.2 | 1.2 | — | — | 1.2 | 1.2 |

-continued

|  | C | D | E | F | G | H | Control -1 | Control -2 |
|---|---|---|---|---|---|---|---|---|
| Vinyl Chloroacetate | — | — | — | — | 1.0 | — | — | — |
| 5-(α-chloroacetoxymethyl)-2-norbornene | — | — | — | — | — | 1.5 | — | — |
| β-Cyanoethyl Acrylate | 0.5 | 0.5 | 0.5 | 0.5 | 0.5 | 0.5 | — | — |
| Mooney Viscosity (ML-4 at 212°F.) | 28 | 39 | 39 | 22 | 31 | 29 | 31 | 30 |

Each of the rubbers was admixed at 100 parts by weight with 80 parts by weight of N550 carbon black, 2 parts Acrawax C, 2 parts TE-80, 3 parts by weight of sodium stearate, and 3 parts by weight of trimethyl soya ammonium chloride. Samples of the compositions were then evaluated as to their scorch times and cure times at 307°F. using a Monsanto Rheometer. The following data was obtained.

0.1% to about 15% by weight of a halogenbearing monomer, (c) from about 0.1% to about 4% by weight of a β-cyanoalkyl acrylate of the formula $$CH_2{=}\overset{R}{\underset{|}{C}}{-}\overset{O}{\underset{\|}{C}}O{-}CH_2{-}\overset{R}{\underset{|}{C}}H{-}CN$$

| Rubber | C | D | E | F | G | H | Control -1 | Control -2 |
|---|---|---|---|---|---|---|---|---|
| Minimum Torque | 17 | 27 | 19 | 15 | 18 | 18 | 15 | 15 |
| Maximum Torque After 60 Minutes | 39 | 62 | 50 | 35 | 22 | 25 | 16 | 16 |
| Ts 2, Minutes | 3.5 | 2.1 | 2.8 | 5.3 | 5.0 | 4.7 | over 30 | over 30 |
| Tc, Minutes | 38.5 | 31.5 | 37.5 | 37.5 | 11.6 | 20.0 | no cure | no cure |

The data shows that the controls 1 and 2, which were compositions containing acrylate rubber having no interpolymerized units of a β-cyanoalkyl acrylate monomer contained therein, did not cure. The compositions of this invention (Samples C to H) were further evaluated as to their vulcanizate properties.

wherein R is defined as above, and (d) up to 49.8% by weight of a copolymerizable monomer containing a terminal vinylidene group selected from the group consisting of vinyl and allyl esters, vinyl ketones, vinyl and allyl ethers, vinyl aromatics, vinyl nitriles, dienes, α-monoolefins, vinyl amides, and divinyls, and (2) a cure

|  | C | D | E | F | G | H |
|---|---|---|---|---|---|---|
| Cured 30 Minutes at 307°F. |  |  |  |  |  |  |
| Tensile, psi | 1390 | 1580 | 1330 | 1250 | 880 | 980 |
| Elongation, percent | 180 | 90 | 110 | 210 | 410 | 310 |
| Hardness, Durometer A | 65 | 70 | 65 | 65 | 57 | 58 |
| Cured 60 Minutes at 307°F. |  |  |  |  |  |  |
| Compression Set, Percent Buttons, 70 Hours at 150°C. | 34 | 37 | 47 | 32 | 43 | 32 |
| Aged 70 Hours at 150°C. Air Test Tube |  |  |  |  |  |  |
| Tensile, psi | 1300 | 1410 | 1160 | 1240 | 600 | 860 |
| Elongation, Percent | 130 | 70 | 50 | 130 | 330 | 230 |
| Hardness, Durometer A | 74 | 79 | 81 | 75 | 64 | 67 |
| Percent Volume Swell ASTM No. 3 Oil 70 Hours at 150°C. | 77 | 24 | 41 | 106 | 107 | 94 |

I claim:

1. A composition comprising (1) an acrylate rubber consisting essentially of interpolymerized units of (a) from about 50% to about 99.8% by weight of an acrylate monomer of the formula $$CH_2{=}\overset{R}{\underset{|}{C}}{-}\overset{O}{\underset{\|}{C}}O{-}R'$$

wherein R is hydrogen, or a methyl or ethyl radical and R' is selected from the group consisting of an alkyl radical containing 1 to about 24 carbon atoms, an alkoxyalkyl radical containing 2 to about 12 carbon atoms in the radical, and an alkylthioalkyl radical containing 2 to about 12 carbon atoms in the radical, (b) from about system consisting essentially of (a) from about 0.5 part to about 7 parts by weight of an alkali metal salt of an organic acid selected from the group consisting of monocarboxylic acids containing 2 to about 24 carbon atoms, organophosphoric acids of the structure (RO$\rightarrow_y$PO$_x$OM)

wherein M is an alkali metal, $y = 1$ or 2, $z = 1$ or 2, and $y + z = 3$, and R is an alkyl radical containing 1 to 24 carbon atoms, an aryl radical containing 6 to 24 carbon atoms, or an alkylphenoxy poly(ethyleneoxy)ethyl radical, and an organosulfonic acid of the structure (RO$\rightarrow_y$SO$_x$OM)

wherein y, z, M, and R are defined as above, (b) from about 0.1 to about 10 parts by weight of a quaternary ammonium salt of the structure

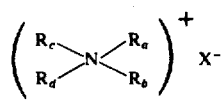

wherein $R_a$, $R_b$, $R_c$ and $R_d$ are hydrocarbon radicals containing 1 to about 18 carbon atoms selected from the group consisting of alkyl, aryl, alkaryl, and aralkyl radicals, or wherein two or three of the $R_a$, $R_b$, $R_c$ and $R_d$ radicals form with the nitrogen atom a heterocyclic structure containing 3 to 8 atoms selected from the group consisting of C, N, O, and S where at least two atoms are C; and X is an anion from an inorganic or organic acid wherein the acidic hydrogen is attached to halogen or oxygen or a monofunctional tertiary amine selected from the group consisting of tertiary aliphatic amines containing 1 to 18 carbon atoms in the aliphatic groups wherein at least one aliphatic group is a methyl or ethyl radical and cyclic methyleneamines and heterocyclic amines containing 4 to 8 carbon atoms in the ring, and (c) up to 15 parts by weight of an acid acceptor, the parts by weight of the cure system ingredients each based upon 100 parts by weight of the acrylate rubber.

2. A composition of claim 1 wherein the acrylate rubber consists essentially of from about 70 to about 99.3% by weight of the acrylate monomer, from about 0.5% to about 5% by weight of the halogen-bearing monomer, from about 0.2% to about 2% by weight of the β-cyanoalkyl acrylate monomer, and up to 29.3% by weight of the copolymerizable vinylidene monomer, where in the formula for the acrylate monomer, R' is an alkyl radical containing 1 to 18 carbon atoms or an alkoxyalkyl radical containing 3 to about 8 carbon atoms total in the radical.

3. A composition of claim 2 wherein the cure system consists essentially of from about 1 to about 5 parts by weight of an alkali metal salt of the defined organic acids, from about 0.3 part to about 5 parts by weight of the defined quaternary ammonium salts or monofunctional tertiary amines, and from about 0.3 part to about 10 parts by weight of an acid acceptor, said parts by weight based on 100 parts by weight of the acrylate rubber.

4. A composition of claim 3 wherein X is an anion selected from the group consisting of $Cl^-$, $Br^-$, $I^-$, $OH^-$, $NO_3^-$, $HSO_4^-$, $NaSO_4^-$, $H_2PO_4^-$, $NaHPO_4^-$, $RCOO^-$, $ROSO_3^-$, $RSO^{3-}$, $H_2BO_3^-$, and $ROPO_3H^-$, where R is an aliphatic, alkyl, or alkaryl radical containing 1 to 18 carbon atoms.

5. A composition of claim 4 wherein the acid acceptor is selected from the group consisting of nonalkali metal oxy compounds, inorganic metal salts, and molecular sieves.

6. A composition of claim 4 wherein the alkali metal salt of an organic acid is an alkali metal salt of a monocarboxylic acid containing from 2 to about 24 carbon atoms in the molecule.

7. A composition of claim 6 wherein the alkali metal salt of an organic acid is sodium stearate.

8. A composition of claim 7 wherein the quaternary ammonium salt is trimethyl soya ammonium chloride.

9. A composition of claim 8 wherein the acrylate rubber consists essentially of interpolymerized units of (a) ethyl acrylate, n-butyl acrylate, 2-ethylhexyl acrylate, methoxyethyl acrylate, or ethoxyethyl acrylate, or mixtures thereof, (b) a halogen-bearing monomer selected from the group consisting of vinyl benzyl chloride, vinyl chloroacetate, and 5-(α-chloroacetoxymethyl)-2-norbornene, (c) β-cyanoethyl acrylate, and (d) up to 29.3% by weight of diethylene glycol dimethacrylate.

10. A composition of claim 9 wherein the acrylate rubber consists of interpolymerized units of ethyl acrylate, n-butyl acrylate, vinyl benzyl chloride, and β-cyanoethyl acrylate.

* * * * *